United States Patent [19]

Katsuno et al.

[11] 4,386,793
[45] Jun. 7, 1983

[54] WEBBING LOCK DEVICE

[75] Inventors: Mitsuaki Katsuno; Mitsuhiro Ogura, both of Toyota, Japan

[73] Assignee: Kabushiki Kaisha Tokai-Rika-Denki Seisakusho, Aichi, Japan

[21] Appl. No.: 244,883

[22] Filed: Mar. 18, 1981

[30] Foreign Application Priority Data

Mar. 21, 1980 [JP] Japan .............................. 55-37615[U]

[51] Int. Cl.³ .......................................... B60R 21/10
[52] U.S. Cl. .................................. 280/802; 297/476; 297/479
[58] Field of Search ............... 280/802, 803, 804, 805, 280/807, 808; 297/468, 469, 474, 476, 479

[56] References Cited

U.S. PATENT DOCUMENTS

| | | | |
|---|---|---|---|
| 4,256,330 | 3/1981 | Geoffrey | 280/802 |
| 4,268,067 | 5/1981 | Thomas | 280/802 |
| 4,291,918 | 9/1981 | Finn | 280/808 |
| 4,306,735 | 12/1981 | Pfeiffer | 280/808 |
| 4,310,176 | 1/1982 | Furusawa | 280/801 |
| 4,310,177 | 1/1982 | Rogers, Jr. et al. | 280/802 |

Primary Examiner—Joseph F. Peters, Jr.
Assistant Examiner—John A. Carroll
Attorney, Agent, or Firm—Parkhurst & Oliff

[57] ABSTRACT

The intermediate portion of an outer webbing is secured to the forward end of an inner webbing through a holder, and opposite ends of the outer webbing are secured to a door, whereby the webbings are automatically fastened to or unfastened from an occupant in accordance with the closing or opening action of the door.

A lock bar provided in the holder functions such that, during normal running condition of a vehicle, the outer webbing and the holder are made movable relative to each other to bring any one of the occupants, having various physical builds into a proper webbing fastened condition, while, in an emergency of the vehicle, the lock bar subjected to a tension in the webbing clampingly holds the webbing between the outer webbing contact portion and itself, thereby securing the occupant in a reliably restrained condition.

10 Claims, 5 Drawing Figures

WEBBING LOCK DEVICE

BACKGROUND OF THE INVENTION

1. Field of the Invention

This invention relates to webbing lock device used in a seatbelt system for locking the intermediate portion of an occupant restraining webbing when necessary, and particularly to a webbing lock device used in a seatbelt system in which the intermediate portion of an outer webbing is turned back at a portion adjacent the forward end of an inner webbing, for locking the turned-back portion of the outer webbing in an emergency of a vehicle.

2. Description of the Prior Art

There have been proposed automatic seatbelt systems for automatically fastening a restraining webbing to a seated occupant, having one form thereof, in which the webbing approaches or recedes from a seat in accordance with the closing or opening a door. In the automatic seatbelt system of the type described, an outer and an inner webbings are used, and the intermediate portion of the outer webbing, opposite ends of which are engaged with the door, is inserted via a through-ring through a portion adjacent the forward end of the inner webbing, one end of which is wound into a retractor provided at the substantially central portion of the vehicle.

Consequently, if the occupant opens the door to enter the vehicle, then, in this automatic seatbelt system, the inner webbing is wound out of the retractor and moves forwardly in the vehicle along with the outer webbing, so that the occupant can easily be seated. If the occupant closes the door upon being seated, then, the inner webbing is wound into the retractor again, so that the occupant can be automatically brought into a three point webbing fastened condition. In this seatbelt system, the outer webbing is movable through the through-ring, so that this seatbelt system can fit for any one of occupants having various physical builds, particularly, in the case either his upper body or lower body is considerably larger than the other. Moreover, the degree of freedom of driving posture taken by the occupant can be increased and also the comfortability can be improved during operation. However, the outer webbing is movable via the through-ring as described above, so that the occupant cannot be satisfactorily restrained in a collision of the vehicle, thereby causing a danger of preventing the seatbelt system from satisfactorily performing its function.

SUMMARY OF THE INVENTION

The present invention has been developed to obviate the abovedescribed disadvantages and has as its object the provision of a webbing lock device, in which the outer webbing is freely movable during normal running condition of the vehicle, and, in an emergency of the vehicle, movement of the outer webbing is locked to improve an occupant restraining performance.

The webbing lock device according to the present invention is of such an arrangement that the intermediate portion of the outer webbing is turned back at an outer webbing contact portion of a holder, the inner webbing is guided around a pair of inner webbing contact portions provided on the holder, a lock bar slidably held by the holder can approach or recede from the outer webbing contact portion, this lock bar bends the inner webbing at the inner webbing contact portion to separate it from the outer webbing contact portion during normal running condition of the vehicle, the lock bar clamps and locks the outer webbing between the outer webbing contact portion and itself under a moving force of the bent inner webbing moving in a direction of releasing the bending due to increased tension in the inner webbing in an emergency of the vehicle, whereby the lock bar prevents the outer webbing from moving in the longitudinal direction thereof, thereby enabling to properly restrain the occupant.

Description will hereunder be given of an embodiment of the present invention with reference to the drawings.

DESCRIPTION OF THE PREFERRED EMBODIMENT

Figure 1:
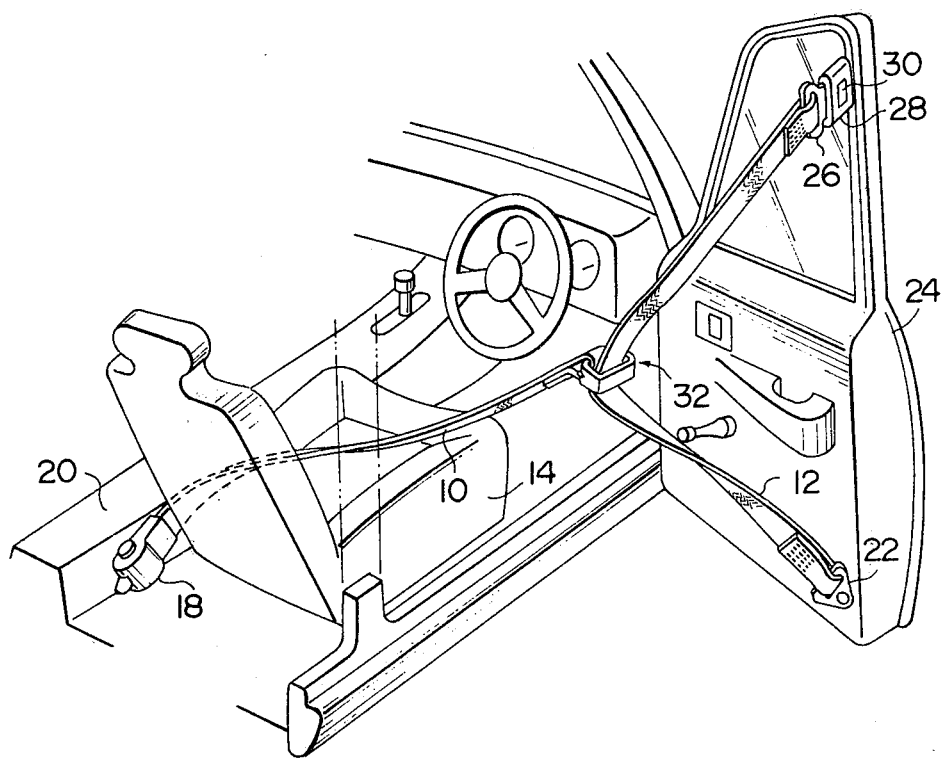
FIG. 1 is a perspective view of the state of the door being opened, showing an embodiment of the webbing lock device according to the present invention.
Figure 2:
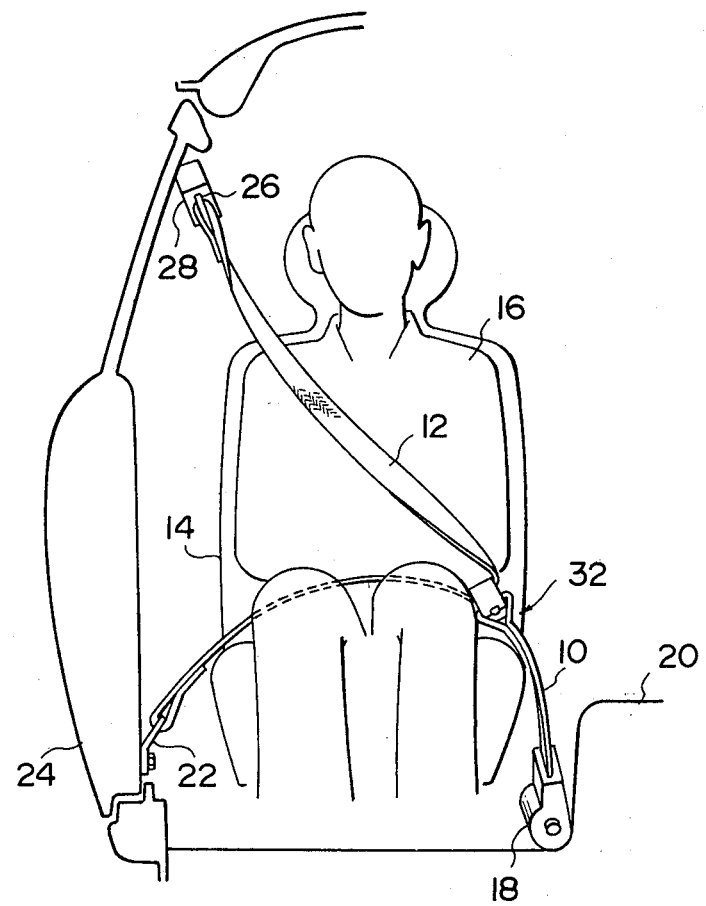
FIG. 2 is a front view showing the state of the door being closed.

As shown in FIGS. 1 and 2, the seatbelt system, to which the present invention is applied, is adapted to bring an occupant 16 seated at a seat 14 into a three point webbing fastened condition by means of an inner webbing 10 and an outer webbing 12.

One end of the inner webbing 10 is wound into a retractor 18, which is secured onto a side wall of a floor tunnel portion 20, and incorporates therein an inertia lock mechanism for winding up the webbing 10 during normal running condition of the vehicle and abruptly stopping the windout of the webbing 10 in an emergency of the vehicle.

One end of the outer webbing 12 is engaged with the lower portion of a door 24 through an anchor plate 22, and the other end thereof is engaged with the upper portion of the door 24 through a tongue plate 26 and a buckle device 28. This buckle device is provided thereon with a release knob 30 and, if the occupant presses the release knob as necessary, then the tongue plate 26 is allowed to fall of the buckle device, thereby permitting the occupant to leave the vehicle during an emergency.

Figure 3:
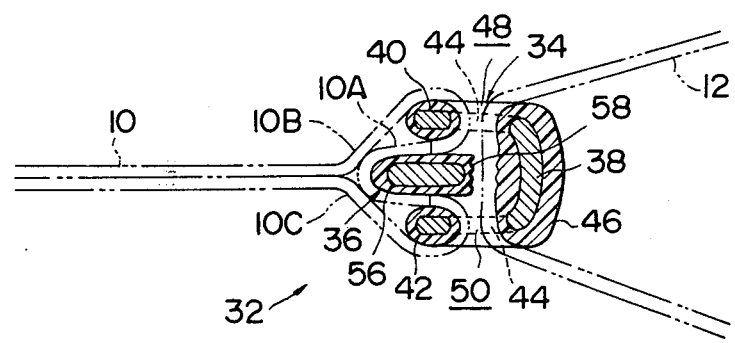
FIG. 3 is a sectional view showing the webbing lock device.
Figure 4:
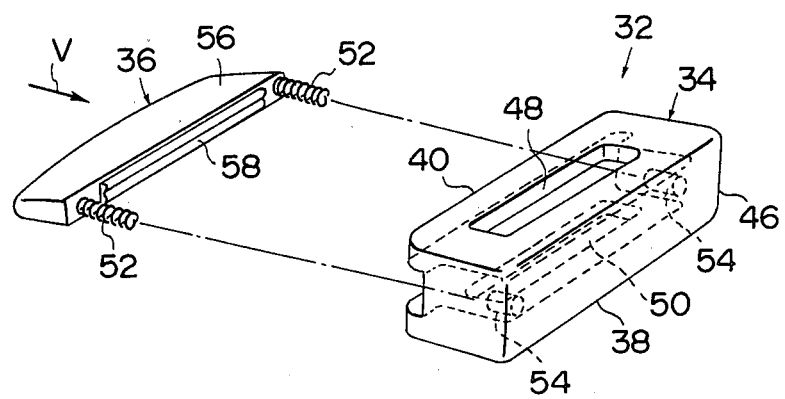
FIG. 4 is a disassembled perspective view showing the holder and the lock bar.
Figure 5:
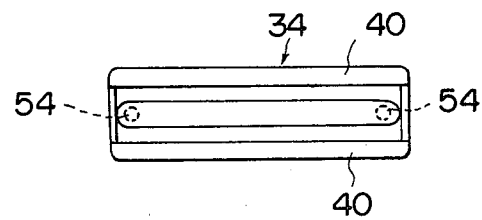
FIG. 5 is a front view of the holder as viewed from a direction indicated by the line V in FIG. 4.

The webbing lock device 32 according to the present invention is provided between the forward end portion of the inner webbing 10 and the intermediate portion of the outer webbing 12. As shown in FIGS. 3 and 4, this webbing lock device 32 is provided thereon with a holder 34 and a lock bar 36. In this holder 34, an outer webbing contact portion 38 and a pair of inner webbing contact portions 40, 42 are arranged in parallel to each other and opposite ends of these contact portions are connected to each other by connecting members 44. This holder 34 is applied on the entire periphery thereof with a resin coating 46, thereby decressing the frictional force of the webbing contacting thereto.

The outer webbing 12 is inserted through webbing insert holes 48, 50 formed between the outer webbing contact portion 38 and the pair of inner webbing contact portions, 40, 42 in the holder 34, whereby the intermediate portion of the outer webbing is guided around the outer webbing contact portion 38 and turned back thereat. Furthermore, the inner webbing 10 is inserted through the webbing inserts holes 48, 50, and the end thereof is sewn onto the intermediate portion thereof, whereby the inner webbing is guided around the inner webbing contact portions 40, 42.

The lock bar 36 is inserted between the inner webbing contact portions 40, 42 and slidable in a manner to be able to approach to recede from the outer webbing contact portion 38, and is biased by a pair of compression coil springs 52 interposed between the outer webbing contact portion 38 and itself in a direction of receding from the outer webbing contact portion 38. Ends of these compression coil springs 52 are inserted into a pair of spring receiving holes 54 penetrated at portions adjacent the opposite end portions of the outer webbing contact portion 38.

As described above, the lock bar 36 are biased in the direction of receding from the outer webbing contact portion 38, whereby the lock bar bends the inner webbing 10 disposed between the inner webbing contact portions 40, 42 into substantially a U-shaped portion 10A. Additionally, the portion of the inner webbing 10 bent and formed into the U-shape comes into contact with portions of the inner webbing (Refer to reference numerals 10B, 10C.) disposed at the opposite side through the inner webbing contact portions 40, 42, i.e., on the side of the retractor 18, whereby the portions 10B, 10C of the inner webbing 10 constitute a stopper for controlling the receding of the lock bar 36 from the outer webbing contact portion 38. Additionally, when the tension in the inner webbing 10 is increased, the portion of the inner webbing 10 bent by the lock bar 36, i.e., when the U-shaped portion 10A is subjected to a force moving it in the direction of the retractor 18 and passing it through the inner webbing contact portions 40, 42, the lock bar 36 is adapted to approach the outer webbing contact portion 38.

In addition, the lock bar 36 has applied thereon a resin coating 56 in the same manner as on the holder 34, and portions of these resin coatings 46 and 56 opposed to each other are formed with wave-shaped surfaces 58 thereon to increase frictional resistances against the outer webbing 12.

A description will hereunder be given of the operation of this embodiment with the abovedescribed arrangement. FIG. 1 shows the door 24 being opened, allowing the occupant to enter the vehicle. When the door 24 is opened, the webbings 10 and 12 are moved forwardly in the vehicle, so that a space allowing the occupant to be seated can be formed between the webbings 10, 12 and the seat 14.

If the door 24 is closed after the occupant has been seated at the seat 14, the webbings 10, 12 are moved rearwardly in the vehicle in accordance with the circularly arcuate closing motion of the door and the remaining portion of the inner webbing 10 is wound into the retractor 18, so that the occupant can be brought into the three point webbing fastened condition as shown in FIG. 2.

Under this condition, the webbing lock device 32 is in the state shown in FIG. 3. Then, the lock bar 36 is separated from the outer webbing contact portion 38, whereby the outer webbing 12 can freely pass through the holder 34, so that the occupant can change the length of the webbing between the holder 34 and the anchor plate 22 or the length of the webbing between the holder 34 and the tongue plate 26. This creates shifts in the length of webbing therebetween, thereby enabling the driver to change his driving posture as desired.

In an emergency such as a collision, the retractor 18 instantaly stops the windout of the webbing 10 through the action of the inertia lock mechanism incorporated therein, so that the occupant can be restrained by the webbings and avoid colliding against dangerous obstacles. In this collision, an inertial force of the occupant 16 renders a high tension to the inner webbing 10 and the outer webbing 12. As a result, in the webbing lock device 32, the inner webbing disposed between the pair of inner webbing contact portions 40, 42 push the lock bar 36 out and approach the outer webbing contact portion 38 against the biasing force of the compression coil spring 52. This lock bar 36 and the outer webbing contact portion 38 clampingly lock the outer webbing 12 therebetween, so that the outer webbing 12 cannot pass this contact portion 38 to move in the longitudinal direction thereof. As a result, the length of the portion of the outer webbing 12 restraining the lap and the length of the portion thereof restraining the shoulder, which are divided by the holder 34, cannot be shifted, whereby the occupant 16 is properly restrained at his lap and shoulder, so that he can avoid being unnecessarily sunk into the seat 14 or having his upper body be thrown out in the direction of the collision to collide against the components in the vehicle.

In addition, pressing the release knob 30 of the buckle device 28 after the collision can release the tongue plate 26, so that the occupant 16 can unfasten the webbings 10, 12 and open the door 24 to leave the vehicle.

As has been described hereinabove, in the webbing lock device according to the present invention, the outer webbing and the inner webbing are guided around the holder. Tension in the inner webbing thus guided around the holder causes the lock bar to come into contact with the outer webbing in an emergency, to thereby prevent the outer webbing from moving in the longitudinal direction thereof. Hence, the present invention can offer such an outstanding advantage that, during normal running condition the occupant is not disturbed in changing his driving posture, and, in an emergency of the vehicle, the occupant can be properly protected.

What is claimed is:

1. A webbing lock device for use in a seatbelt system wherein the intermediate portion of an outer webbing is turned back adjacent the forward end of an inner webbing, comprising:
    (a) a holder connecting the inner webbing to an intermediate portion of the outer webbing, said holder provided therein with inner webbing contact portions and an outer webbing contact portion;
    (b) a lock bar slidably held between said inner webbing contact portions in said holder and capable of being moved, by operation of the inner webbing, in a perpendicular direction to the longitudinal direction of the outer webbing passing through said holder;
    (c) holding means for holding said lock bar at a position spaced apart from the outer webbing when the tension of the inner webbing is less than a predetermined value, the tension in the inner webbing moving said lock bar toward said outer webbing contact portion to contact the outer webbing, in a direction perpendicular to the longitudinal direction of the outer webbing, together with said outer webbing contact portion when the tension of inner webbing is more than the predetermined value, whereby the positional relationship between the outer webbing and said holder is made adjustable during normal operation of the vehicle, so that the occupant can be brought into a proper webbing fastened condition, and whereby the outer webbing is prevented from moving in the longitudinal direction thereof with respect to said holder when the tension of the inner webbing is more than the predetermined value.

2. A webbing lock device as set forth in claim 1, wherein said inner webbing contact portions comprise a pair of contact portions of said holder and wherein said lock bar is interposed therebetween.

3. A webbing lock device as set forth in claim 2, wherein the forward end portion of the inner webbing is successively guided around said pair of contact portions and turned back thereat, and where the forward end portion of the inner webbing is sewn onto the other portion of the inner webbing, to encircle a portion of said holder.

4. A webbing lock device as set forth in claim 3, wherein said lock bar is urged into engagement with the inner webbing between said pair of portions to bend the inner webbing therebetween by said holding means when the tensile of the inner webbing is less the the predetermined value, and said lock bar is urged into engagement with the outer webbing by flattening said bent inner webbing between said pair of contact portions in response to the increased tension of the inner webbing to prevent said outer webbing from moving in the longitudinal direction thereof with respect to said holder.

5. A webbing lock device as set forth in claim 4, wherein said bent inner webbing between said pair of contact portions comes into abutting contact with portions of the inner webbing turned back at said pair of contact portions, to thereby control the maximum separation between said outer webbing and said lock bar.

6. A webbing lock device as set forth in Claim 5, wherein said lock bar and said outer webbing contact portion are provided at the surfaces opposed to each other with wave-shaped surfaces, to thereby increase frictional resistance with the outer webbing when the outer webbing is clamped therebetween.

7. A webbing lock device as set forth in claim 2, wherein in said holder, said outer webbing contact portion and said pair of contact portions are arranged in parallel to one another, and longitudinally opposite ends of said outer webbing contact portion are connected to each one end of said inner webbing contact portions.

8. A webbing lock device as set forth in claim 6, wherein said holding means is a compression coil spring interposed between the lock bar and the holder.

9. A webbing lock device as set forth in claim 1, wherein opposite ends of said outer webbing are moved forwardly in the vehicle when the occupant enters or leaves the vehicle to form a space for allowing the occupant to enter or leave the vehicle between the seat and the outer webbing.

10. A webbing lock device for use in a three-point passive seatbelt system having an inner webbing engaged at one end thereof with substantially the central portion of the vehicle, and an outer webbing engaged at both ends thereof with upper and lower portions of a door, respectively, wherein an occupant is automatically restrained, comprising:

(a) a holder having an opening defined by inner webbing contact portions and an outer webbing contact portion, said holder connecting the inner webbing to the outer webbing, said inner webbing being wound around said inner webbing contact portions so that the forward end of the inner webbing is sewn onto the other portion thereof and said outer webbing being guided at the intermediate portion thereof;

(b) a lock bar slidably held in the holder and interposed between said inner webbing contact portions;

(c) resilient means provided between said lock bar and said holder for separating the lock bar from the outer webbing on said outer webbing contact portion during normal operation of the vehicle, and allowing the outer webbing to move in the longitudinal direction thereof when the tension of the inner webbing is less than predetermined value; whereby in an emergency, said lock bar is urged into contact with the outer webbing so that the outer webbing is clamped between the surface of said lock bar and outer webbing contact portion facing to said opening so as to prevent the outer webbing from moving in the longitudinal direction thereof with respect to said holder.

* * * * *